United States Patent [19]

Lehner

[11] Patent Number: 4,499,873
[45] Date of Patent: Feb. 19, 1985

[54] CONTROL ROD SYSTEM FOR FUEL INJECTION DEVICES FOR DIESEL ENGINES

[75] Inventor: Gerhard Lehner, Hallein, Austria

[73] Assignee: Friedmann & Maier Aktiengesellschaft, Friedmannstrasse, Austria

[21] Appl. No.: 224,449

[22] Filed: Jan. 12, 1981

[51] Int. Cl.$^3$ .............................................. F02M 59/20
[52] U.S. Cl. .................................... 123/372; 123/364; 123/501; 239/88
[58] Field of Search ....................... 123/372, 364, 501; 239/88–93

[56] References Cited

U.S. PATENT DOCUMENTS

| | | | |
|---|---|---|---|
| 2,125,210 | 7/1938 | Trapp | 123/501 |
| 2,516,691 | 7/1950 | French | 239/88 |
| 3,566,849 | 3/1971 | Frick | 239/88 |
| 4,036,196 | 7/1977 | Hamilton | 123/364 |

FOREIGN PATENT DOCUMENTS 2903875  8/1979  Fed. Rep. of Germany ...... 123/501

*Primary Examiner*—Magdalen Y. C. Moy
*Attorney, Agent, or Firm*—Cushman, Darby & Cushman

[57] ABSTRACT

The control rod system for the fuel injection devices being designed as pump-nozzle-units (1) for Diesel engines comprises two control rods (7, 8) offset transversely relative to the axis to the pump-nozzle-unit and in longitudinal direction of this axis, said control rods being connected via slide pieces (11, 12) and lever arms (15, 16) with the control shafts (9, 10) rotatably supported on the engine and being common for all pump-nozzle-units (1). As seen in axial direction of the pump-nozzle-unit (1), at least the slide piece (12) located less remote from the nozzle is, with retracted control rod (8), not overlapping the control shaft (9) which is located more remote from the nozzle, so that dismounting of the pump-nozzle-unit by moving it upwardly can be effected without dismounting the control shaft (FIG. 5).

4 Claims, 5 Drawing Figures

CONTROL ROD SYSTEM FOR FUEL INJECTION DEVICES FOR DIESEL ENGINES

The invention refers to a control rod system for fuel injection devices for Diesel engines having the motor cylinders arranged in at least one row, of the type in which fuel injection pump and fuel injection nozzle are combined to one pump-nozzle-unit associated with one motor cylinder each and comprising two axially shiftable control rods integrated with the pump-nozzle-unit and influencing different operational parameters, the integrated control rods being adapted to be coupled with control members arranged on the motor. Such pump-nozzle-units must occasionally be dismounted and, if necessary, be interchanged or replaced. In this case, there results with known arrangements the difficulty that the control member arranged on the motor and being, with known arrangements, formed of a control rod extending over the whole length of the motor must be dismounted. This does not only result in substantial labor but also in the danger that adjustment of the control device becomes changed so that adjustment must be effected anew.

It is an object of the present invention to facilitate in an arrangement of the type mentioned dismounting and reinstalling of the pump-nozzle-units and the invention essentially consists in that the control members arranged on the motor are designed as control shafts rotatably supported in parallel relation to the longitudinal axis of the motor (i.e. a straight line connecting the centers of the circles formed by the cross sections of the cylinders), in that the control rods are guided within the housing of the pump-nozzle-unit for being shifted in approximately perpendicular direction to the longitudinal axis of the motor, in that lever arms are arranged on the control shafts and designed for engaging slide pieces arranged on the control rods, in that the control rods are, as seen in axial direction of the pump-nozzle-unit, laterally offset one with respect to the other and in that, as seen in axial direction of the pump-nozzle-unit, at least the slide piece of the control rod located less remote from the nozzle is with the control rod retracted not overlapping at least the control shaft located more remote from the nozzle. In this manner it is also with a pump-nozzle-unit provided with two control rods possible to simply heave out a pump-nozzle-unit after removal of the screw connection, because no portion whatsoever of the control shaft represents an obstacle for such dismounting. In this case, the rocker arms can, in a manner known per se, be laterally shifted. It is, however, essential that the control rods integrated into the pump-nozzle-unit extend approximately perpendicularly relative to the control shaft and are actuated by lever arms, because in this manner the required free space can be provided. Thus, it is not required to dismount the control shaft arranged on the motor in time-consuming work and it is not required to open a connection between the control rod system and the regulator. Thus, the advantage is achieved that adjustment of the individual pump-nozzle-units is not changed because the relative position between the main control rod and the cylinder head of the motor is maintained. If a new pump-nozzle-unit is to be installed, adjustment of this pump-nozzle-unit can be effected on the teststand. The control rods integrated with the pump-nozzle-unit serve the usual purpose of controlling several operational parameters such as for example the amount of fuel injected and the moment of the fuel injection.

According to the invention, the lever arms are conveniently provided with bolts which, as seen in axial direction of the pump-nozzle-unit, laterally engage grooves, preferably annular grooves, perpendicularly arranged relative to the axes of the control shafts, of the slide pieces. In this manner, the bolts of the lever arms can when heaving a pump-nozzle-unit simply leave said grooves.

According to a preferred embodiment of the invention, the slide pieces are connected with the control rods in an adjustable manner. This provides the possibility to adjust the pump units in a still non-installed condition, which can, for example, be made on a test stand. According to the invention, the lever arm can be clamped on the control shaft, so that also in this case adjustment of the position of the levers on the control shaft can be effected by means of a gauge. This adjustment can remain unchanged later on, and in view of the possibility to adjust the slide pieces of the control rods of the pump units remote from their mounted position, reinstalling of a repaired pump-nozzle-unit or installing of a new pump-nozzle-unit is possible without adjusting the regulating means.

The invention is schematically illustrated with reference to embodiments shown in the drawing.

Figure 1:
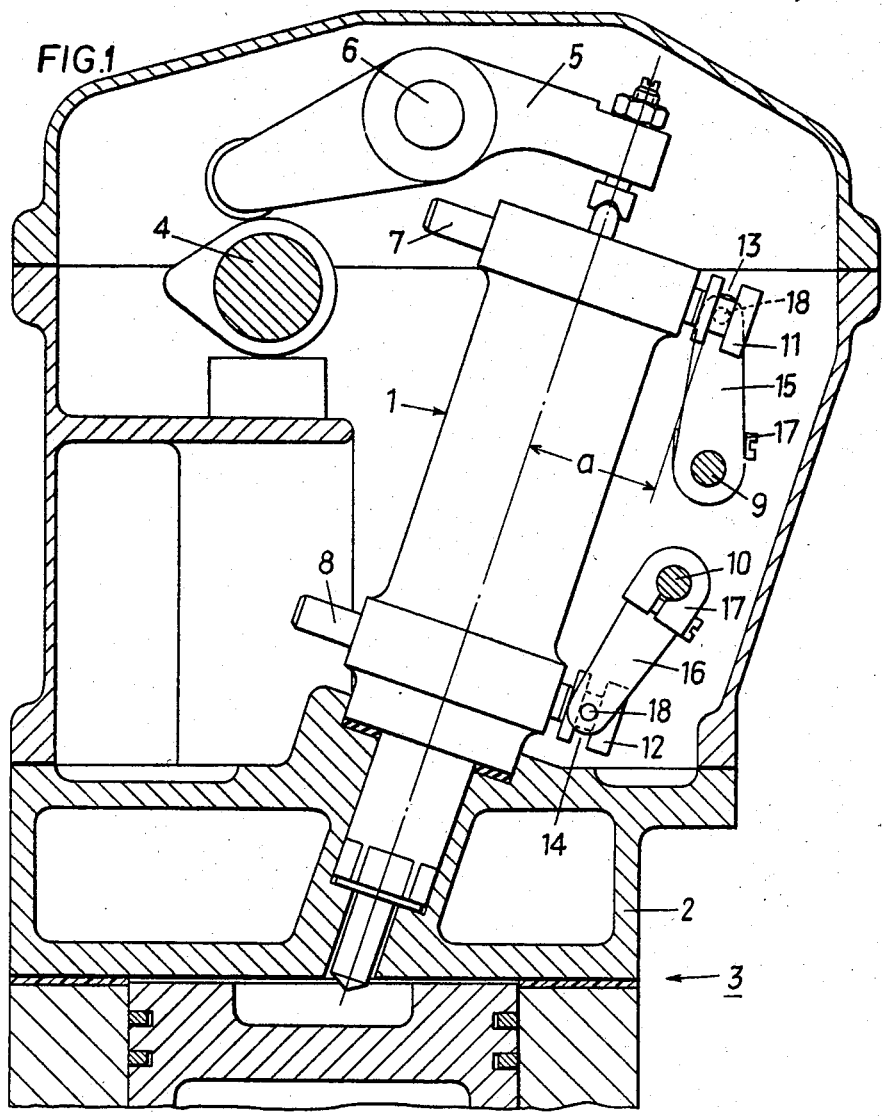
FIG. 1 shows a cross section through the upper portion of a motor with a pump-nozzle-unit inserted.

In the arrangement according to FIG. 1, 1 is the pump-nozzle-unit which is inserted into the cylinder head 2 of an in-line engine 3. The pump-nozzle-unit is actuated by means of a cam shaft 4 via a rocker lever 5. This rocker lever 5 is, in a manner not shown, latterally shiftable on the rocker lever shaft 6 for giving free the pump-nozzle-unit in case this unit shall be dismounted.

Two control rods 7 and 8 are integrated into the pump-nozzle-unit 1 what means that they are guided within the housing of the pump-nozzle-unit 1. One of these control rods, for example the control rod 7, control the amount of fuel injected and the second control rod, for example the control rod 8, controls the moment of fuel injection.

A control shaft 9 is associated with the control rod 7 and rotatably supported on the engine 3 and rotated by a regulator. A control shaft 10 is associated with the control rod 8 and is equally rotatably supported on the engine and controlled by a regulator. Both control shafts 9 and 10 extend over the length of the in-line engine 3. The control rods 7 and 8 are connected with slide pieces 11 and 12 being provided with annular grooves 13 and 14 extending perpendicularly relative to the axis of these control rods and being engaged by bolts 18 of lever arms 15 and 16 clamped onto the control shafts 9 and 10 by means of clamping pieces 17. The control rods and the rocker levers are, as is shown in FIG. 5, offset one relative to the other as seen in a top plan view and thus also the levers 15 and 16 are laterally offset one relative to the other. As is shown in FIGS. 4 and 5 no portion of the lower control rod 8 overlaps the upper control shaft 9 so that the pump nozzle unit can be removed outwardly along the axis of the unit after having laterally shifted the rocking levers 5 and after having loosened the mounting screws engaging the bores 19.

Figure 2:
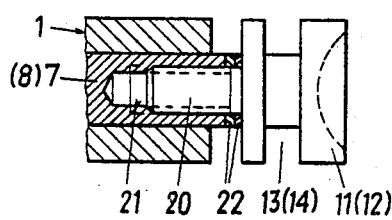
FIGS. 2 and 3 show two embodiments of a control rod with a slide piece in an axial section through the control rod.

The slide pieces 11 and 12 are adjustably connected with the control rod 7 and 8, respectively. For this purpose, the slide pieces 11 and 12 form an integral part with screw bolts 20 being screwed into axial threaded bores 21 of the control rods 7 and 8. In this manner, any possible tolerances of the pump-nozzle-unit itself can be compensated and the corresponding operational parameters can correctly be adjusted. In the embodiment according to FIG. 2, this can be effected by one or more adjusting discs 22. With a definite operational parameter the distance a can correctly and precisely be adjusted.

Figure 3:
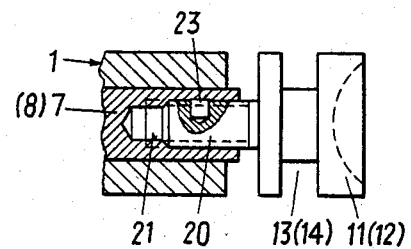

The embodiment according to FIG. 3 shows a known type of a screw lock consisting in that a plug 23 of synthetic plastics material is inserted into the threaded bolt. It is also possible to use as a security means a ring, known per se, of synthetic plastics material or to lock the screw connection by means of an adhesive.

Figure 4:
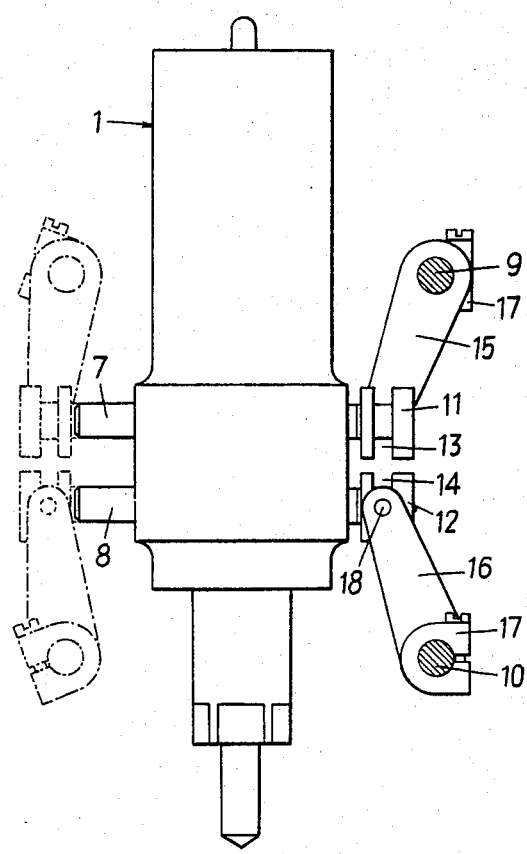
FIG. 4 shows a modified arrangement of the pump-nozzle-unit in a cross section through the control shaft.
Figure 5:
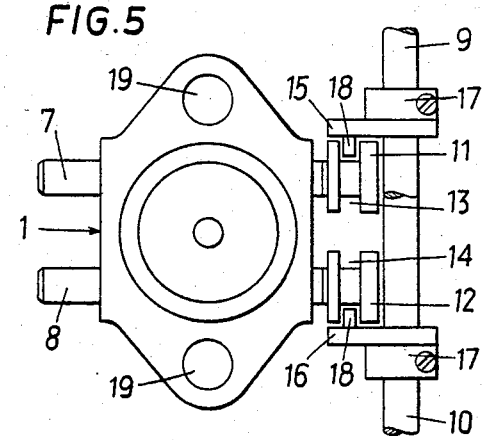
FIG. 5 shows a top plan view of a pump unit according to FIG. 4 or according to FIG. 1.

The embodiment shown in FIG. 4 differs from the embodiment shown in FIG. 1 only in that the control rods 7 and 8 are axially arranged with a smaller distance. In this case also the possibility to arrange the control shafts 9, 10 on the other side of the pump nozzle unit 1 is shown in dash-dotted lines.

What is claimed is:

1. Control rod system for fuel injection devices for Diesel engines having cylinders arranged in at least one row having a longitudinal axis, of the type in which fuel injection pump and fuel injection nozzle are combined in one pump-nozzle-unit associated with one engine cylinder each, the unit including a housing and two axially shiftable control rods integrated with the pump-nozzle-unit and influencing different operational parameters, the integrated control rods being adapted to be coupled with control members arranged on the engine, characterized in that, the control members arranged on the engine are designed as control shafts rotatably supported in parallel relation to the longitudinal axis of the engine, in that the control rods are guided within the housing of the pump-nozzle-unit for being shifted in approximately perpendicular direction to the longitudinal axis of the engine, in that lever arms are arranged on the control shafts and designed for engaging slide pieces arranged on the control rods in that the control rods are, as seen in axial direction of the pump-nozzle-unit, laterally offset one with respect to the other and in that, as seen in axial direction of the pump-nozzle-unit at least the slide piece of the control rod located less remote from the nozzle is with the control rod retracted not overlapping at least the control shaft located more remote from the nozzle.

2. Control rod system as claimed in claim 1 characterized in that the lever arms comprise bolts which, as seen in axial direction of the pump nozzle unit, laterally engage grooves, preferably annular grooves, of the slide pieces, said grooves being arranged perpendicularly relative to the axes of the control rods.

3. Control rod system as claimed in claim 1 or 2, characterized in that the slide pieces are adjustably connected with the control rods.

4. Control rod system as claimed in claim 1 or 2, characterized in that the lever arms are fixedly clamped onto the control shafts.

* * * * *